United States Patent [19]

Pescatore et al.

[11] Patent Number: 4,708,645

[45] Date of Patent: Nov. 24, 1987

[54] MACHINES FOR HEATING ARTICLES OR PRODUCTS BY CONDENSING VAPORS ON THEM

[75] Inventors: Richard Pescatore, Antibes; Jean-Jack Boumendil, Villeneuve Loubet, both of France

[73] Assignee: Piezo-Ceram Electronique, Antibes, France

[21] Appl. No.: 921,044

[22] PCT Filed: Feb. 3, 1986

[86] PCT No.: PCT/FR86/00028
§ 371 Date: Oct. 3, 1986
§ 102(e) Date: Oct. 3, 1986

[87] PCT Pub. No.: WO86/04533
PCT Pub. Date: Aug. 14, 1986

[30] Foreign Application Priority Data

Feb. 4, 1985 [FR] France .................. 85 01489

[51] Int. Cl.⁴ .................. F27B 9/04; F28D 15/00
[52] U.S. Cl. .................. 432/152; 432/197; 55/85; 55/228; 210/181; 210/182; 165/104.26
[58] Field of Search .................. 432/121, 152, 197; 165/1, 104.26; 210/181, 182; 55/85, 225

[56] References Cited

U.S. PATENT DOCUMENTS

| 2,477,318 | 7/1949 | Stevenson | 210/182 |
| 3,487,015 | 12/1969 | Buester | 210/181 |
| 4,055,217 | 10/1977 | Chu et al. | 165/104.26 |
| 4,321,031 | 3/1982 | Woodgate | 433/152 |
| 4,353,715 | 10/1982 | Mir et al. | 55/85 |
| 4,431,608 | 2/1984 | Katagiri et al. | 55/228 |

FOREIGN PATENT DOCUMENTS 112484 7/1984 European Pat. Off. .

Primary Examiner—Henry C. Yuen
Attorney, Agent, or Firm—A. W. Breiner

[57] ABSTRACT

Improvements to machines for heating articles or products by condensation of primary vapor on said products or articles, the primary vapor isolated from the atmosphere by a secondary vapor mass. According to the invention, a first improvement is aimed at lowering the chlorine and fluorine ion contents in the primary and secondary vapors of the plant resulting from the decomposition of said vapors. To this effect, the invention provides an improved washing of the secondary liquid. Furthermore, a dry gas sweeping between damp atmospheric air and the secondary vapor prevents the introduction of atmospheric moisture. Another improvement relates to the automatic compensation of variations in operating conditions by controlling the power balance.

5 Claims, 2 Drawing Figures

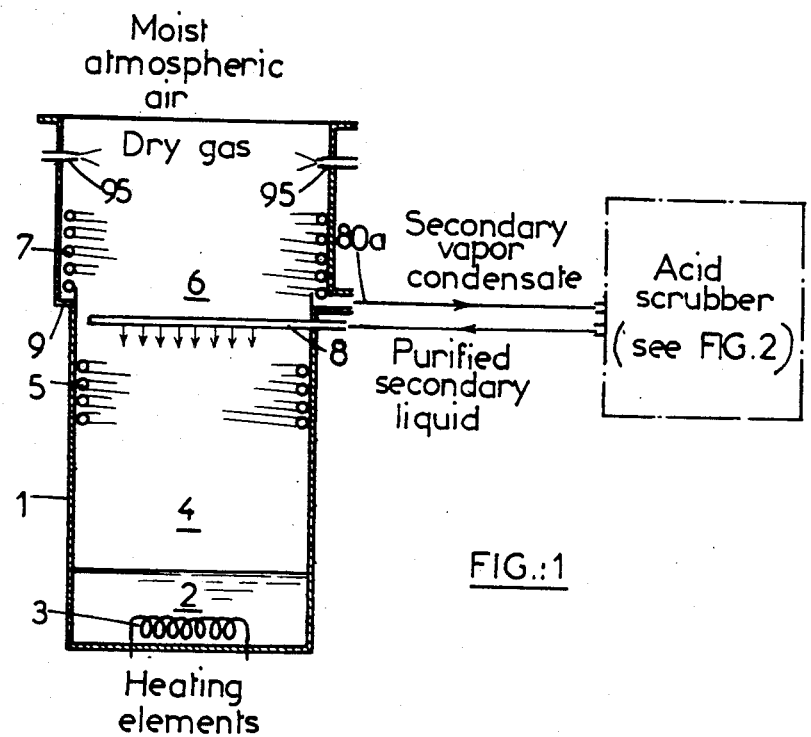
FIG.:1
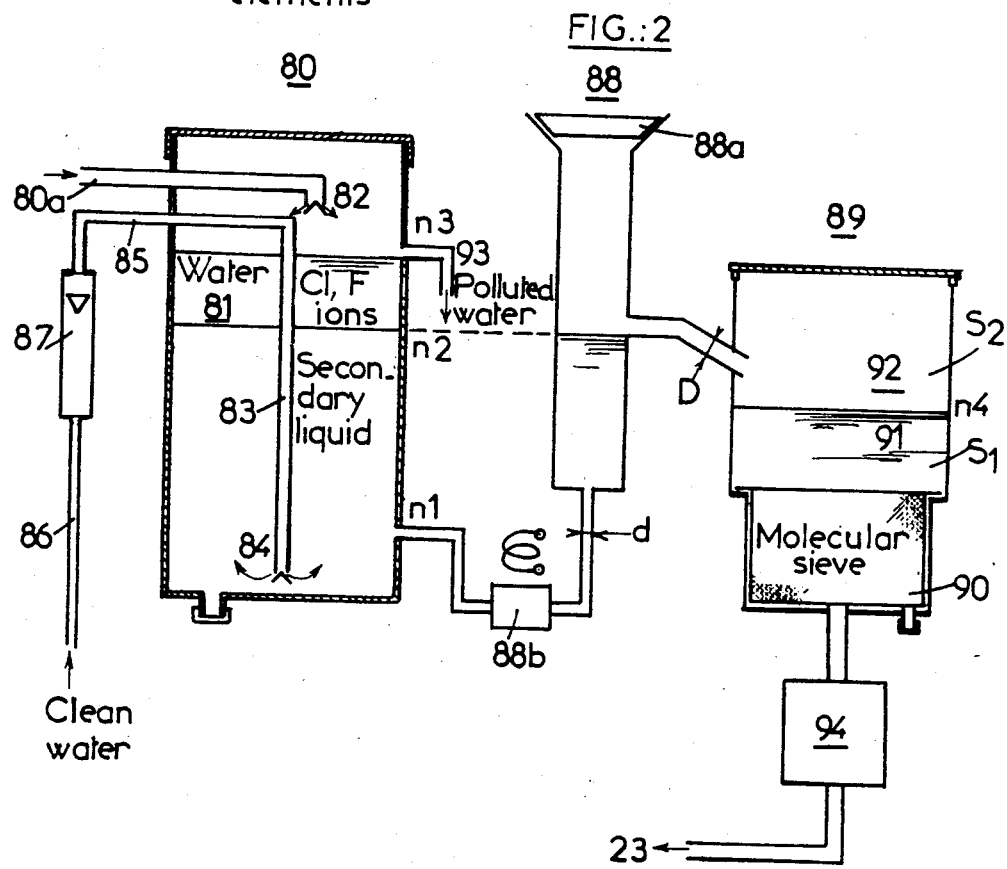
FIG.:2

MACHINES FOR HEATING ARTICLES OR PRODUCTS BY CONDENSING VAPORS ON THEM

FIELD OF INVENTION

The present invention relates to improvements to machines for heating articles or products by condensing vapors on them.

BACKGROUND OF INVENTION

Machines for heating articles or products by condensing vapors on them are known (see for example FR-A-2.243.045, FR-A-2.553.186 and U.S. Pat. No. 4,055,217). In these machines the articles or products are heated to the desired temperature by the condensation of a primary vapor. As the primary liquid constituting the source of the primary vapor is usually a very expensive inert, high boiling point perfluorocarbon liquid, it is customary to confine the primary vapor mass in relation to the atmosphere by means of a secondary vapor mass generated from a secondary liquid, usually a chlorofluorocarbon, having a lower boiling point than the primary liquid. It is also known to provide means for condensing the secondary vapor, in order to prevent it from escaping to the atmosphere, and for recycling the primary vapor condensate to the machine. It is also known to separate the secondary liquid from the water originating from the atmosphere and contained in the condensate by eliminating the supernatant water in a separator (see for example U.S. Pat. No. 3,632,480 and EP-A-0112.484).

SUMMARY OF INVENTION

The invention seeks to provide various improvements to the type of machine described above.

The aim of a first improvement is to lower the content of chlorine and fluorine ions in the primary and secondary vapors in the equipment which result from the decomposition of these vapors. To this end the invention provides improved scrubbing of the secondary liquid. Moreover, a current of dry gas interposed between the humid atmospheric air and the secondary vapor combats the introduction of atmospheric humidity.

Another improvement consists in automatically compensating for variations of operating conditions by controlling the power balance.

These improvements will be described below in greater detail with reference to the accompanying drawing, which is given by way of example.

DRAWING AND DETAILED DESCRIPTION OF PREFERRED EMBODIMENT

FIG. 1 shows schematically an improved machine, while

FIG. 2 is a detailed section of the acid scrubber shown on the right in FIG. 1.

FIG. 1 shows schematically one example of a machine to which the improvements according to the invention can be applied.

This machine comprises a vertical tank 1, for example of rectangular section, comprising, from bottom to top, primary liquid 2 (usually a liquid perfluorocarbon) which can be brought to boiling point by one or more heating elements 3 and/or equivalent means (heating bath), a chamber 4 for heating the article or product which is to be heated, said chamber being filled, when in operation, with primary liquid vapor; a thermostatically controlled coil 5 for condensing primary liquid vapor and held at a temperature intermediate between the boiling points of the primary and secondary liquids; a zone 6 filled with a vapor mass of a secondary liquid (usually a chlorofluorocarbon) having a boiling point lower than that of the primary liquid, said vapor mass forming a stopper for the primary liquid vapor; a cooled coil 7 for condensing secondary liquid vapor. The secondary vapor may be generated by injecting secondary liquid with the aid of a row of atomizers 8, as shown, connected to a secondary liquid tank. As an alternative the secondary liquid could simply be mixed with the primary liquid 2.

The secondary liquid condensed on the coil 7 is collected in a gutter 9 and passed to the purifier shown in FIG. 2, which constitutes one of the improvements according to the invention. After purification the secondary liquid serves to feed the row of atomizers 8 (or is returned to the bottom of the tank in the case of the alternative mentioned).

A more detailed description will now be given of the various improvements provided by the present invention.

I—LOWERING OF IONIC CHLORINE AND FLUORINE CONTENTS IN THE MACHINE

Because of a thermal degradation process, $H^+$, $Cl^-$, and $F^-$ ions appear in the secondary vapor in contact with atmospheric moisture. These ions give rise to the formation of acids which cause corrosion of the equipment and pollution of the articles and parts heated.

It is therefore necessary to eliminate these ions and prevent then from being recycled to the machine; the introduction of moisture into the machine must also be avoided.

The acid scrubber shown in detail in FIG. 2 comprises a first vessel 80 connected to the condensate return pipe 80a, which passes through a layer of water 81 in order to trap the ions. In order to assist the scrubbing, a diffuser 82 divides the condensates into fine droplets before they enter the water. The layer of water is kept at a constant level through the injection of clean water through a diffuser 84 at the bottom of the scrubber, the polluted water passing out at the top at the level n3. A swan neck 85 on the scrubbing water flow pipe 86 prevents the return of secondary liquid into the water, which could block the flowmeter 87. At the level n1 the secondary liquid, which may be slightly charged with water, is taken off through an electro-valve 88b. This electro-valve makes it possible to isolate the vessel 80 from the vessels 88 and 89 during stoppages and the start-up time of the equipment. The vessel 88 permits filling at the start or in the course of the operation of the equipment. It is provided with a detachable cover 88a for filling purposes. The vessel 89 serves as a reservoir for secondary liquid and for drying said liquid over a molecular sieve 90, in order to eliminate all traces of water. This arrangement makes it possible to eliminate residual scrubbing water and also the water introduced in the course of loading the equipment with secondary liquid. This sieve may for example be composed of zeolite, forming a crystal lattice of silicoaluminate, into which monovalent K or Na cations or divalent cations have been introduced, the size of the cations determining the dimensions of the pores which trap the water. A material of this kind is known under the trademark "silliporite".

Two level monitors S1 at 91 and S2 at 92 make it possible to detect the minimum operating level necessitating the filling of the equipment, and the maximum level for termination of filling.

The selection of the diameters d and D of the pipes, the relative volume of the vessel 88 in relation to the vessels 80 and 89, and the electro-valve 88b make it possible to avoid direct entry of water into the secondary liquid in the reservoir and inopportune variations of the level n2 entailing the flow of secondary liquid through the waste outlet 93 discharging polluted water.

The metering pump 94 allows the secondary liquid to be recycled to the tank of the machine by way of the spray nozzles 23.

The level n1 defines a space $V_1$ in the vessel 80. The level n2 defines in the vessel 88 a space such that $V_1 < V_2$. The level n3 is determined in dependence on the difference between the densities of the scrubbing water (d=1) and the secondary liquid, whose density is close to 1.5. The level n4 is variable during operation.

In order to prevent the introduction of humidity into the machine, according to the invention a current of dry gas is provided in the top part of the tank of the machine, so avoiding direct contact between atmospheric air and the vapors produced in the tank. In FIG. 1 nozzles 95 can be seen, which are distributed over the top of the tank and through which dry air is injected radially.

In the case of the polymerization of polymers in the vapor phase, this arrangement makes it possible to avoid the introduction of water into the primary vapor, if the amount of secondary vapor is minimized, and, in the case of brazing, to avoid the introduction of water into the secondary vapor.

II—AUTOMATIC COMPENSATION FOR VARIATIONS OF THE LOADING CONDITIONS OF THE MACHINE

The thermal balance of the machine is such that the energy transmitted by the heating element or elements to the primary liquid, through the action of the primary vapor, balances heat losses through the walls of the tank, gives rise to the evaporation of the secondary liquid, heats the water of the secondary coil, and also heats the load.

Under stabilized conditions the loss through the walls and the energy absorbed by the condensation of the secondary liquid are constants characteristic of the size of the equipment. The heating of the water will therefore be the resultant of energy supply through the heating elements and the absorption of the mass introduced.

According to the invention the thermal operation of the machine is therefore regulated by adjusting the power transmitted to the heating elements in dependence on the nature of the load introduced, by controlling the temperature rise of the water in the coil 7 serving to condense the secondary liquid vapor.

Experimentation shows that the reaction time of this regulation is very short in comparison with the thermal energy of the equipment, thus permitting the maintenance of the density of vapor surrounding the part to be heated through the determination of slight residual overheating of the water in the secondary coil.

Subsidiary temperature monitoring devices complete the equipment in respect of security.

We claim:

1. In a machine for heating an article or product to a high temperature by condensing vapor on it, which comprises:
    a chamber for heating the article or product which is to be heated, said chamber being adapted to receive a vapor of a primary liquid having a boiling point which is at least equal to said high temperature,
    at least one passage leading into said chamber for the introduction and discharge of said article or product to be heated,
    heating means adapted to bring to boiling point a primary liquid contained in a boiler and to produce primary vapor intended to be delivered into said chamber,
    primary condensation means adapted to condense the primary vapor into primary liquid, and to return it to the boiler,
    means for establishing in said passage a mass of vapor of a secondary liquid having a boiling point lower than that of the primary liquid, said mass completely filling a portion of said passage,
    secondary condensation means adapted to condense the secondary vapor into secondary liquid,
    secondary collector means adapted to collect the secondary vapor condensate, which contains $H^+$, $Cl^-$, and $F^-$ ions generated during operation of said machine and water coming from air moisture, and to pass it into a secondary liquid purification device for the purpose of dewatering said condensate before recycling it to the means of establishing the mass of secondary vapor, the improvement wherein said secondary liquid purification device comprises
    a first vessel containing a lower layer of secondary liquid and an upper layer of water,
    means for delivering the secondary vapor condensate coming from said secondary collector means into said first vessel in such a manner that said condensate passes through said upper layer of water and is freed of $H^+$, $Cl^-$, and $F^-$ ions before being admixed with said lower layer of secondary liquid,
    means for supplying fresh water to said first vessel,
    an upper outlet provided at an upper level of said first vessel for overflow of said upper layer,
    a lower outlet provided at a lower level of said first vessel for withdrawing secondary liquid containing residual water from said lower layer,
    a second vessel connected to said lower outlet and provided with means for removing residual water from said water-containing secondary liquid, and
    means for recycling the dewatered secondary liquid to the means of establishing the mass of secondary vapor.

2. A machine according to claim 1, in which said first and second vessels are connected together through a valve.

3. A machine according to claim 2, in which, in addition, contains an intermediate third vessel having an inlet disposed downstream of the valve and communicating with said second vessel at a level intermediate between said upper and lower levels.

4. A machine according to claim 1, comprising, in addition, means provided in the top part of said passage for injecting into said passage a dry gas forming a barrier between the ambient atmosphere and the mass of vapor of secondary liquid.

5. A machine according to claim 1, wherein said secondary condensation means comprise a coil in which cooling water is circulated, and which further comprises means for regulating the power transmitted to said heating means as a function of the temperature rise of said cooling water.

* * * * *